(12) United States Patent
Pfeilschifter et al.

(10) Patent No.: US 12,447,840 B2
(45) Date of Patent: Oct. 21, 2025

(54) CHARGING VOLTAGE CONVERTER ON A VEHICLE, HAVING REVERSE CURRENT BLOCKING DEVICE

(71) Applicant: Vitesco Technologies GmbH, Regensburg (DE)

(72) Inventors: Franz Pfeilschifter, Munich (DE); Martin Götzenberger, Munich (DE); Manuel Brunner, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 210 days.

(21) Appl. No.: 18/276,345

(22) PCT Filed: Dec. 22, 2021

(86) PCT No.: PCT/EP2021/087225
§ 371 (c)(1),
(2) Date: Aug. 8, 2023

(87) PCT Pub. No.: WO2022/171346
PCT Pub. Date: Aug. 18, 2022

(65) Prior Publication Data
US 2024/0128855 A1 Apr. 18, 2024

(30) Foreign Application Priority Data
Feb. 15, 2021 (DE) .................... 10 2021 201 401.1

(51) Int. Cl.
*B60L 53/24* (2019.01)
*H02H 3/18* (2006.01)
(Continued)

(52) U.S. Cl.
CPC .............. *B60L 53/24* (2019.02); *H02H 3/18* (2013.01); *H02M 1/32* (2013.01); *H02M 3/158* (2013.01)

(58) Field of Classification Search
CPC .......... B60L 53/20; B60L 53/22; B60L 53/24; B60L 2210/10; B60L 2210/12;
(Continued)

(56) References Cited

U.S. PATENT DOCUMENTS 4,959,602 A 9/1990 Scott et al.
7,839,665 B2 11/2010 Toba et al.
(Continued)

FOREIGN PATENT DOCUMENTS

DE 102007024567 A1 11/2008
DE 102016114101 A1 2/2017
(Continued)

OTHER PUBLICATIONS

Office Action (Notice to Submit Response) issued Nov. 12, 2024, by the Korean Intellectual Property Office in Corresponding Korean Patent Application No. 10-2023-7030869 and an English translation of the Office Action. (10 pages).
(Continued)

*Primary Examiner* — Alex Torres-Rivera
(74) *Attorney, Agent, or Firm* — Buchanan Ingersoll & Rooney PC

(57) ABSTRACT

A charging voltage converter on a vehicle is equipped with an upstream circuit, which includes at least one working inductor. Furthermore, the converter has a switching unit, which is connected downstream of the upstream circuit. The working inductor connects a first input potential of an input of the voltage converter to the switching unit. A second input potential of the input is connected via a reverse current blocking device of the upstream circuit to the switching unit.

11 Claims, 2 Drawing Sheets

(51) Int. Cl.
*H02M 1/32* (2007.01)
*H02M 3/158* (2006.01)

(58) Field of Classification Search
CPC ............ B60L 2210/14; B60L 2210/20; B60L 2210/22; B60L 2210/30; B60L 2210/40; B60L 2210/42; B60L 2210/44; B60L 2210/46; H02M 1/4225; H02M 1/32
See application file for complete search history.

(56) References Cited

U.S. PATENT DOCUMENTS

| | | | | |
|---|---|---|---|---|
| 9,484,806 | B2* | 11/2016 | Jeong | H02M 1/4225 |
| 9,873,341 | B2* | 1/2018 | Albanna | B60L 53/22 |
| 2013/0033786 | A1 | 2/2013 | Mao et al. | |
| 2017/0222641 | A1* | 8/2017 | Zou | B60L 15/007 |
| 2018/0050631 | A1* | 2/2018 | Wonhong | H05B 45/38 |
| 2019/0190259 | A1* | 6/2019 | Ludwig | H02M 3/158 |

FOREIGN PATENT DOCUMENTS

| | | |
|---|---|---|
| DE | 102018208358 A1 | 11/2019 |
| EP | 1445785 A2 | 8/2004 |
| EP | 3331146 A1 | 6/2018 |
| JP | 2009072040 A | 4/2009 |
| JP | 4890247 B2 | 3/2012 |
| JP | 2013232995 A | 11/2013 |

OTHER PUBLICATIONS

International Search Report and Written Opinion for International Application No. PCT/EP2021/087225, mailed Apr. 25, 2022, 14 pages.

International Search Report and Written Opinion for International Application No. PCT/EP2021/087225, mailed Apr. 25, 2022, 12 pages (German).

* cited by examiner

CHARGING VOLTAGE CONVERTER ON A VEHICLE, HAVING REVERSE CURRENT BLOCKING DEVICE

CROSS REFERENCE TO RELATED APPLICATIONS

This application is the U.S. National Phase Application of PCT International Application No. PCT/EP2021/087225, filed Dec. 22, 2021, which claims priority to German Patent Application No. 10 2021 201 401.1, filed Feb. 15, 2021, the contents of such applications being incorporated by reference herein.

BACKGROUND OF THE INVENTION

Vehicles with electrical drive have an accumulator, which provides the electrical energy required for driving. The vehicle is connected via a charging terminal to a charging station via cable for charging.

To enable high traction powers, numerous vehicles are equipped with a high-voltage accumulator or high-voltage network having a rated voltage of at least 600 V, in particular having a rated voltage of 800 V, while numerous charging stations provide a lower DC voltage as the charging voltage, in particular charging stations according to the CHAdeMO standard, which provides up to 500 V charging voltage. A DC-DC converter is used to adapt the voltage.

Furthermore, the high-voltage network of the vehicle is electrically insulated from the vehicle ground potential or the chassis in correct operation. The charging station provides a ground, which is connected to the vehicle ground as a safety measure during charging. If an insulation fault of the high-voltage network in relation to the vehicle ground occurs, the ground is then used as a safety measure. Since the charging energy is transmitted via wires having a large cross section and it is not always ensured that the ground has a corresponding cross section or is adequately connected to the ground potential, there is the risk of a high touch voltage. An insulation monitor can have a reaction time which is not adequate to avoid damage to a user due to the insulation fault.

SUMMARY OF THE INVENTION

An aspect of the invention aims to disclose a possibility, using which the wired charging may be made safer and in particular a deficient ground does not have the result that a hazardous touch voltage arises due to an insulation fault.

It is proposed that a voltage converter be equipped with a reverse current blocking device, via which the input of the converter is connected to the switching unit of the converter. An unlimited current flow from a potential of the high-voltage network via the grounding connection, which can run partially via a user in the event of faulty grounding, to the other potential of the high-voltage network is avoided in a simple manner by the reverse current blocking device. The reverse current blocking device is preferably designed to conduct current only in one direction, so that the protective effect occurs immediately and not only after a periodic active evaluation, as an insulation monitor would execute. A hazardous current flow via a user is reduced or also delayed by the reverse current blocking device.

The function of a grounding conductor can be maintained by the reduction or limiting of the current flow and the grounding conductor is prevented from being damaged by unlimited current flow. The storage inductor of the converter can furthermore be divided into two working inductors (one at each converter input potential), so that in the event of faulty grounding, one of the working inductors at least initially limits the current flow (according to the jump response of the inductor), so that the delay or the reduced rate of increase of other safety measures enables an identification of the insulation fault and the performance of safety measures before the current flow is unlimited.

A charging voltage converter on a vehicle is described having an upstream circuit, which includes a working inductor. Furthermore, the charging voltage converter includes a switching unit. This is connected downstream of the upstream circuit. The upstream circuit and the switching unit together form a DC-DC converter having storage choke and switch, in particular a step-up converter. The function of the storage choke of the converter thus formed is implemented by the (at least one) working inductor. The (cyclic) switches of the DC-DC converter are located in the switching unit; the switching components provided therein implement the function of the switches of the DC-DC converter. The upstream circuit and the switching unit thus form a step-up converter, the working inductor of which leads to a connecting point of two switching elements, which lead to the outlet or to the other potential rail, respectively.

The at least one working inductor (or one working inductor thereof) connects a first input potential of an input of the voltage converter to the switching unit. A second input potential of the input is connected via a reverse current blocking device of the upstream circuit to the switching unit. In other words, the working inductor and the reverse current blocking device are provided in different potential rails of the voltage converter.

The switching unit includes switching elements which are connected to one another via a connecting point. The working inductor (or with multiple working inductors: the first working inductor) connects the first input potential to the connecting point. A switching element of the switching unit is connected between the working inductor and a first output potential of the converter and the reverse current blocking device is connected downstream in the second input potential (or connected upstream of a second output potential). Therefore, a switching element of the switching unit (diode or transistor) is located in one potential rail (=connection of the first input potential to the first output potential) and the reverse current blocking device is located in the other potential rail (=connection of the second input potential to the second output potential). The first input potential and the first output potential have the same polarity. The second input potential and the second output potential have the same polarity.

As a possibility, the step-up converter thus formed can include a diode leading to the (positive) output and a switch (transistor) leading to the other potential as switching elements (of the switching unit) and can therefore be made unidirectional. The first potential of the input is connected via the working inductor to the remaining converter. A (further) diode in the potential rail of the second potential is used as the reverse current blocking device. The diode suppresses an unlimited current reverse flow in the event of faulty grounding and thus forms the reverse current blocking device.

As a further possibility, the step-up converter thus formed can include a switch leading to the (positive) output and a further switch (transistor) leading to the other output potential as switching elements and can therefore be made bidirectional, wherein in this case the storage choke is provided by two working inductors, which connect different potentials of the converter input to the remaining converter. One of the working inductors is connected to the connecting point of the switches of the switching unit and the second of the working inductors is connected via a transistor as the reverse current blocking device. The transistor is configured to be opened when a grounding fault or an insulation fault is detected. The second working inductor slows the current increase in the event of an insulation fault and thus protects the user or the ground, so that the time in which the current slowly rises can be used to be able to carry out safety measures.

The mentioned possibilities share the feature that an input of the voltage converter is provided which is connected via a reverse current blocking device to the switching unit. The reverse current blocking device is in particular part of the upstream circuit (which also provides the function of the storage choke of the converter).

The working inductor is preferably provided between a first input potential of the input and a connecting point of two switching elements of the switching unit connected in series. The first input potential of the input, in particular the positive input potential, is connected to the switching unit (or its connecting point) via the working inductor. The reverse current blocking device is designed in particular to block a current flow from the switching unit (via the reverse current blocking device itself) to a second input potential. The blocking effect/switching of the reverse current blocking device results in particular due to the polarity of the voltage which is applied to the control route (i.e., via the reverse current blocking device itself). However, a transistor can also be used as the reverse current blocking device, the blocking effect of which is determined by a signal applied at the control input of the transistor (gate or base), so that the signal controls that no reverse current can flow.

However, the reverse current blocking device preferably includes a diode element. Its blocking direction preferably points from the second (for example negative) input potential toward the switching unit. As mentioned, in other embodiments the reverse current blocking device can include a transistor, which is designed (for example on the basis of its activation) to block a current flow from the second input potential toward the switching unit.

The two connected switching elements of the switching unit can be formed as a transistor and as a diode, or are two transistors. In the first-mentioned case, the converter is unidirectional and in the second-mentioned case, the converter can be made bidirectional, wherein in the second-mentioned case, the converter is made unidirectional when the upper transistor is activated according to the function of a diode (for example to reduce losses in relation to a diode as a component at this point).

The charging current converter is preferably designed as a unidirectional DC-DC converter. The diode can thus prevent an excess current flow as the reverse current blocking device. Two opposing currents can be superimposed in the diode in the event of a reverse current via the ground, so that a reduced current absolute value results. These are, for example, the reverse current leading via the ground toward the switching unit and the current flowing away from the switching unit, which occur in particular when the output potentials of the converter in relation to ground are shifted due to an insulation fault and an input-side varistor between the input and the ground potential limits the voltage between input (input potential) and ground potential. The varistors can also not be part of the converter, however, but rather can be provided in the connected charging column in order to achieve the relevant effect.

As mentioned, two working inductors (in different input potential rails) can also be provided. A first working inductor can be provided as (at least one) working inductor or converter storage choke. This is arranged between a first input potential of the input (for example the positive one) and a connecting point of two switching elements of the switching unit connected in series (and connects them). The upstream circuit can include a second working inductor, which is provided in series between a second input potential of the input (for example the negative one) and the switching unit. The second working inductor is therefore provided in the negative potential rail between input and switching unit.

The reverse current blocking device is preferably designed to block a current flow from the switching unit via the reverse current blocking device to a second input potential, i.e., it is designed to block a current flow into the negative potential rail (switchable), in particular in the direction from the input toward the switching unit. In a charging mode and in a reverse feed mode of the charging voltage converter, the reverse current blocking device can be activated to conduct and can be designed to block in the event of an insulation fault, wherein then the relevant working inductor reduces a current increase of an insulation fault current and thus allows time for executing safety measures.

The reverse current blocking device can include a transistor, which is designed to block a current flow from the second input potential toward the switching unit, in particular in that it is activated accordingly. The transistor includes an inverse diode, via which no current flows during charging due to its blocking direction, so that the activation state of the transistor determines the current flow. During the reverse feed, current also flows via this transistor with a blocking transistor, namely via the inverse diode. In this case, the relevant inductor (i.e., the design by means of an inductor in both potential rails of the input) is used to reduce the current increase in the case of a fault (insulation fault case) and thus allows the execution of safety measures.

The switching unit preferably includes two transistors in this case. These form the two connected switching elements of the switching unit. The charging voltage converter can thus be designed as a bidirectional DC-DC converter.

The upstream circuit can include a free-wheeling diode. This is connected at the connecting point of the switching elements of the switching unit. In other words, the free-wheeling diode connects those ends of the two working inductors which are opposite to the input. The free-wheeling diode has a blocking direction which points from the connecting point of the switching elements (positive input potential) to the reverse current blocking device (in the negative potential rail of the input).

In other words, the free-wheeling diode and the reverse current blocking device are connected to one another in series via a connecting point (of the upstream circuit), wherein the second input potential is connected via the second working inductor to this connecting point and the first input potential is connected via the first working inductor to one end of the free-wheeling diode which is opposite to the mentioned connecting point.

The transistor or the transistors of the switching unit are cyclically activated in the charging mode. A step-up voltage conversion (boost) from the voltage at the input toward the output results. Since the embodiments mentioned here allow a charging mode, the converter described here is described as a charging voltage converter. However, this does not preclude further functions, in particular not the reverse feed. The converter described here is also capable of the reverse feed when the switching unit includes two transistors (in a series circuit) as described; a bidirectional DC-DC converter results. The transistors are also accordingly cyclically activated during the reverse feed.

The converter can furthermore include a varistor which connects a potential of the input to the ground potential. The first potential of the input is preferably connected via a first varistor to the ground potential and the second potential of the input is connected via a second varistor to the ground potential. The jump voltage, from which the varistors become conductive, corresponds to half of the typical input voltage including a typical deviation margin, by which the voltage of the relevant input potential in relation to ground can deviate from a target, such as 50 V or 100 V.

The at least one working inductor is designed as a converter storage choke. Preferably, this has a quality of at least 5, 10, 25, or 50 or also of at least 100 at a frequency of 100 kHz. The at least one working inductor is in particular not an interference filter choke, in particular since its low quality does not permit efficient operation as a working inductor.

The charging voltage converter preferably has an intermediate circuit capacitor, which bypasses the potentials of the output of the converter and thus smooths the output voltage.

If the reverse current blocking device is made switchable by means of an external signal, for example as a transistor, it is opened when a fault is detected. In particular, the transistors of the switching unit are also opened when a fault is detected. The fault is preferably an insulation fault, in particular of an output potential of the converter in relation to vehicle ground. A fault identification unit can be provided, which identifies this fault, and which activates at least the transistors that form the reverse current blocking device.

The fault identification unit can be designed to measure at least one input potential or output potential in relation to vehicle ground. If the absolute value of the voltage is outside a specified range, for example, greater than 550 V between output potential and vehicle ground at a typical operating voltage of 800 V between the output potentials, or if the polarity is reversed, then this is identified as an insulation fault. The fault identification unit can alternatively or additionally be designed to detect a current through the ground conductor (protective conductor). If this is above a threshold value, this is identified as an insulation fault. For this purpose, a current sensor can be provided at the ground conductor or a ground connection.

Furthermore, a current meter such as a current sensor or a shunt can be provided in each case at the input potentials or their connections, in order to determine whether the absolute value of the current which leads into the one input potential or the one input potential rail corresponds to the absolute value of the current which is led out of the other input potential or the other input potential rail. If the difference of the absolute values is greater than a fault current threshold value, this is identified as an insulation fault.

The voltage converter can be configured such that in the event of an identified fault, all transistors are permanently opened (for example for a minimum period of time or until receiving a reset signal) (converter becomes inactive, reverse current blocking device possibly activated to open), and that a reset signal required to activate the converter can only be input in an encrypted manner or via a lockable contact. It can be provided that the fault number is counted and the converter only opens as mentioned if a fault number of all transistors is exceeded. If additional circuit breakers are provided, these are also opened like the mentioned transistors. If an insulation fault is identified, an interrupt signal (end energy transfer) can be emitted by the converter, in particular at a connected charging column.

The charging voltage converter can include an input which provides a contact for the first and the second input potential. In particular, the input can include a contact for a protective conductor (=ground conductor) or for a ground potential. The charging voltage converter can be provided in a housing or in a vehicle chassis, the (ground) potential of which is electrically insulated from the voltage converter. The protective conductor or the ground potential of the input or the charging station can be connected to this (conductive) housing or the vehicle chassis. The voltage converter permits a protection in the event of an insulation fault if the ground is faulty in particular outside the vehicle, i.e., at the charging station (i.e., has an excessive ground resistance). The protection is provided in particular by the reverse current blocking device. In one embodiment having one working inductor at each input potential, the working inductor allows a slowing of the current rise upon occurrence of the fault, so that countermeasures (opening all switches) can be taken before the current exceeds a specific (hazardous) absolute value.

Furthermore, a bypass switch can be provided, which connects the first input potential (such as the positive input potential) in a switchable manner to a corresponding output potential (such as the positive output potential) of the switching unit. A bypass of the converter or a bypass results. The bypass switch is closed for the direct connection of the input to the converter output; in this case the converter (i.e., its switching unit) is inactive. If the bypass switch is open, the switching unit can be active (i.e., cyclic switching to carry out a voltage conversion). The bypass switch is preferably connected directly (without a switch) at the relevant input potential. The charging voltage converter can furthermore include a first circuit breaker. This is provided between the first input potential (such as the positive input potential) and the working inductor which leads to the switching unit. In other words, the mentioned working inductor is provided in the positive connection path between input and switching unit. A further, second working inductor can be connected downstream from the other, second input potential (such as the negative input potential) and connect the input to the switching unit in a negative connection path. Like the bypass switch, the first circuit breaker is preferably connected directly (without a switch) at the relevant input potential. Viewed from the first input potential, both the first circuit breaker (in a first path) and also the bypass switch (in a second path) originate. The first circuit breaker is therefore not connected upstream of the bypass switch. A second circuit breaker can be provided which connects the second input potential (such as the negative one) to the reverse current blocking device directly or via a fuse. This connection is in particular free of a switch.

The reverse current blocking device can include a first diode element according to a further embodiment, which is connected in parallel to a series circuit having a second diode element (opposite polarity) and a (possibly further) fuse. The blocking direction of the first diode element points from the second input potential toward the switching unit. The blocking direction of the second diode element points from the switching unit toward the second input potential. The reverse current blocking device thus includes a series circuit made up of a fuse and a second diode element. A reverse current (which occurs upon a power transmission from the input to the converter output) toward the second input potential thus runs via the first diode element. In the opposite direction, for example, during the reverse feed, which is lower in power in any case (in comparison to charging), the current runs through the second diode element and the fuse, which thus switches off the current, for example, in case of fault (upon exceeding of the fuse limiting current). In the event of faults in the ground, the hazardous current is thus limited directly and immediately by the fuse. Further safety measures can follow upon the triggering of this fuse, such as the opening of circuit breakers. The reverse current blocking device described here can be used instead of the above-described reverse current blocking devices (or in series combination with one of the above-described reverse current blocking devices).

BRIEF DESCRIPTION ON THE DRAWINGS

DETAILED DESCRIPTION OF THE PREFERRED EMBODIMENTS

Figure 1:
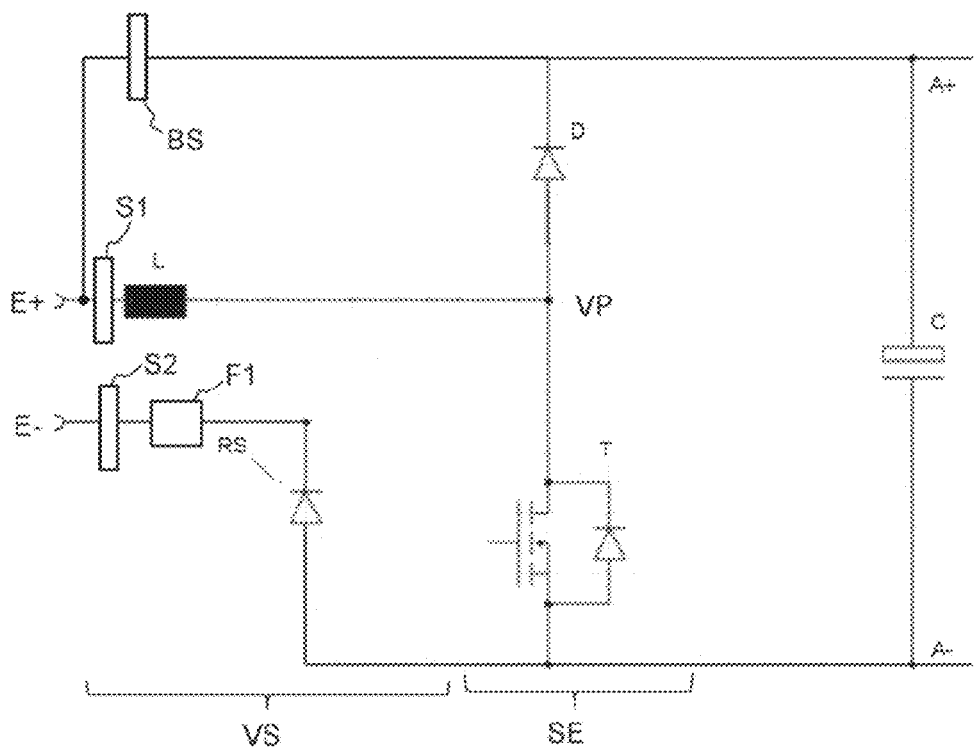
FIGS. 1 and 2 are used to explain the charging voltage converter on a vehicle described here.
Figure 2:
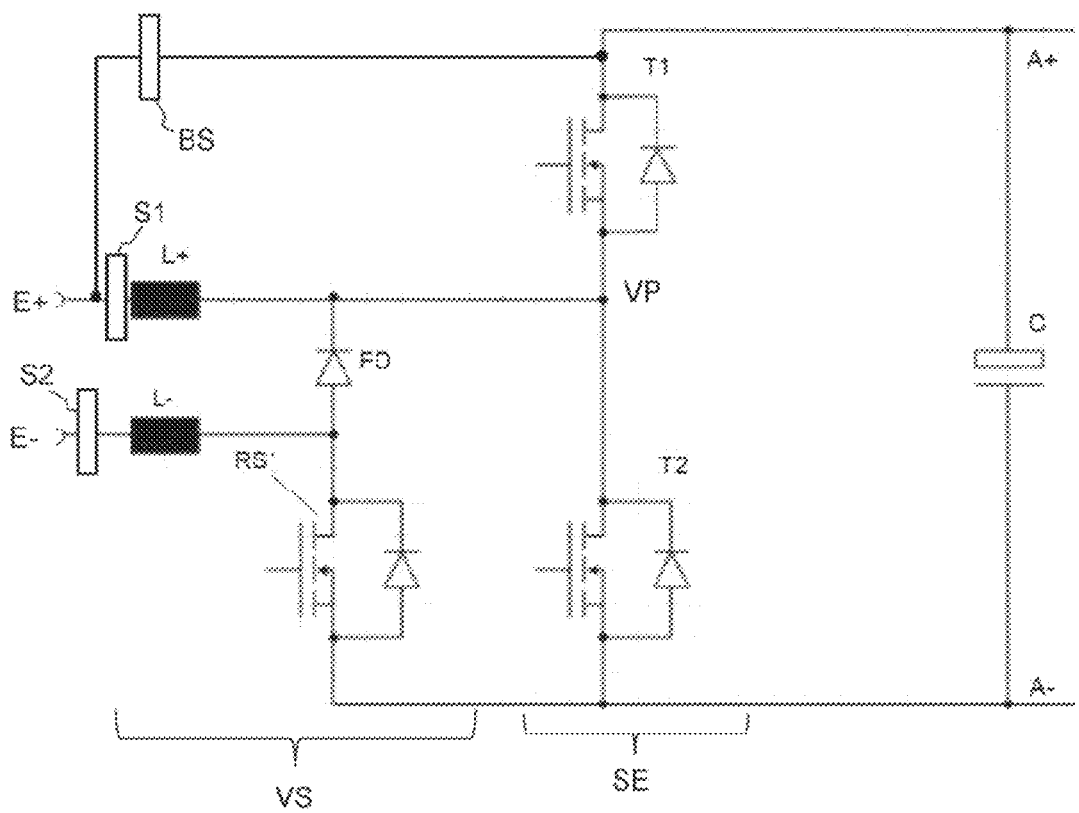

FIG. 1 shows a circuit to explain embodiments having a working inductor, which forms the storage choke of the converter, and having a self-controlling reverse current blocking device in the form of a diode. FIG. 2 shows a circuit to explain embodiments having a working inductor, which is distributed and is formed by two storage chokes of the converter, and having an externally-controlled reverse current blocking device in the form of a transistor.

FIG. 1 and FIG. 2 each show a charging voltage converter on a vehicle comprising an upstream circuit VS and a switching unit SE, which is connected downstream of the upstream circuit VS. The input of the charging voltage converter is represented by a first positive input potential E+ and a second negative input potential E−. The term "input" relates to the energy flow direction during charging. The input of the charging voltage converter corresponds to the input of the upstream circuit VS. The switching unit SE includes two switching elements which are connected to one another in series via a connecting point VP. The connecting point VP is connected via the first switching element to the first output potential A+ and is connected via the second switching element to the second output potential A−.

The circuits of the two figures differ with regard to the first switching element. The prefix "output . . . " relates to the energy flow direction during charging. The switching unit SE is connected, on the one hand, via its connecting point VP and, on the other hand, via the second output potential A− of the switching unit SE to the upstream circuit VS.

As with numerous DC-DC converter topologies (boost converter, SEPIC converter, Cuk converter, . . . ), the converter shown in the figures provides a working choke and a downstream switching unit, which implements the voltage conversion by cyclic switching together with the working choke. The function of the working choke is provided here by the upstream circuit VS, and the function of the switching unit by the downstream switching unit SE. The switching unit SE follows an intermediate circuit capacitor C, which is present between the output potentials A+ and A−.

A reverse current blocking device RS is shown in each of FIGS. 1 and 2, which is connected in series between the second input potential of the upstream circuit or the converter and the second output potential of the switching unit SE or the converter. The circuits of FIGS. 1 and 2 differ with regard to the implementation of the reverse current blocking device RS.

In FIG. 1, the function of the working choke is implemented by the working inductor L, which is connected in series between the first input potential E+ and the connecting point VP of the switching unit SE. In contrast, the second input potential E− is connected without a working inductor to the switching unit SE (i.e., to the second output potential A−). The second input potential E− is connected via the reverse current blocking device RS to the switching unit SE (i.e., to the second output potential A−).

The reverse current blocking device RS is a diode in FIG. 1, i.e., a switching element the switching state of which is only dependent on the polarity between the ends of the element and in particular does not necessarily have to be activated by other switching signals. The blocking direction of the reverse current blocking device RS of FIG. 1 points from the second output potential A− to the second input potential E−, i.e., away from the switching unit. This suppresses a current flow from A− (or A+) via a user and a ground to the potential E−, which can arise in the event of an insulation fault if the ground is malfunctioning, for example, a fault in the ground connection between the two network sections which are bridged by the converter (for example a fault in the ground connection between charging station and vehicle). The diode which provides the reverse current blocking device RS suppresses the reverse flow of current in this case, which would flow counter to a charging current.

The switching unit includes as a first switching element a (further) diode D, which is provided between the first output potential A+ and the connecting point VP and the transmission direction of which points from the VP to the output potential A+. Further embodiments provide a transistor instead of the diode, so that in particular a reverse feed capability results. The function of the illustrated diode D can also be implemented by a transistor, which is activated so that the transmission and blocking function of the diode results. This is possibly advantageous in relation to a diode upon use of transistors having lower transmission voltage or having low ON resistance. The switching unit SE includes a transistor T as a second switching element, which is provided between the connecting point VP and the second output potential A−. The function of the step-up conversion of DC voltage results by cyclic switching of the transistor.

The function of the working choke of the working inductors L+ and L− is implemented in FIG. 2. The function of the working choke is thus divided onto the first and second working inductors L+ and L−. The first working inductor L+ is connected in series between the first input potential E+ and the connecting point VP of the switching unit SE (corresponding to the inductor L of FIG. 1). The second input potential E− is connected (inter alia) via the second working inductor L− to the switching unit SE (i.e., to the second output potential A−). The second working inductor L− is connected via the reverse current blocking device RS' to the switching unit SE (i.e., to the second output potential A−).

The reverse current blocking device RS' is a transistor in FIG. 2, i.e., a switching element, the switching state of which may be controlled by an (external) control signal. This enables a current flow for the reverse feed, i.e., a current flow which occurs upon an energy transmission from the output A+, A− to the input E+, E− of the converter. In the event of an identified insulation fault (for example when the potential A+ or A− in relation to a ground potential leaves a predetermined rated voltage window due to an insulation fault), the converter is configured to open the reverse current blocking device RS', in particular if the rated voltage window is left at a frequency greater than a predetermined limiting frequency or for longer than a predetermined tolerance time window.

It can be provided that the reverse current blocking device RS' controllable by means of a signal in FIG. 2 can only be closed again by means of a protected signal once it has been opened because of a fault. Such a protected signal is, for example, a signal that can only be input via a lockable interface or which corresponds to a specific code, in order to thus ensure that only authorized personnel can reset. The transistor which represents the reverse current blocking device RS' is a MOSFET, the inverse diode of which has a blocking direction as shown, which points from the second output potential A− to the second input potential E−, i.e., away from the switching unit. With open switching state of the MOSFET, which the reverse current blocking device RS' provides, this suppresses a current flow from A− (or A+) via a user and a ground to the potential E−, which can arise in the event of an insulation fault when the ground is malfunctioning, for example, a fault in the ground connection between the two network sections which are bypassed by the converter (such as a fault in the ground connection between charging station and vehicle).

Instead of the MOSFET (reference sign RS') in general a transistor with inverse diode (body diode) or without inverse diode can be used. The inverse diode of the reverse current blocking device RS, if present, suppresses the reverse flow of current in this case, which would flow opposite to a charging current, if this is not desired. In reverse feed operation, RS' is in the closed state.

FIG. 2 shows a free-wheeling diode FD, which connects a connecting point VP of switching elements T1, T2 of a switching unit SE (explained in more detail hereinafter) to the reverse current blocking device RS'. In other words, the free-wheeling diode FD connects the connecting point VP to that end of the second working inductor L which is opposite to the input E−, E+. The free-wheeling diode FD connects that end of the first working inductor L+, which is opposite to the input E−, E+, to the reverse current blocking device RS'. The free-wheeling diode FD connects those ends of the first and second working inductor L+, L− which are opposite to the input E−, E+. The free-wheeling diode FD protects the switching elements T1, T2 of the switching unit SE from a high voltage which can arise upon opening (of T1, T2, RS') due to self-induction of the working inductor L+ and/or L−.

If a current arises between the potentials A+, A− and a ground potential due to an occurring insulation fault, an unlimited current flow then does not begin immediately, but rather the inductor L− limits the current flow at its beginning according to Lenz's law, so that a time window results in which the current flow is still low and measures can be taken, such as deactivating the switching unit SE (all externally controllable switches open) and possibly also opening the reverse current blocking device RS' controllable via signal.

The above-mentioned switching unit SE of FIG. 2 includes as a first switching element a transistor T1, which is provided between the first output potential A+ and the connecting point VP. This transistor has an inverse diode, the transmission direction of which points from the VP to the output potential A+. Because the switching element T1 is designed as a transistor, a reverse feed function of the converter results, in which the functions of input (E+, E−) and output (A+, A−) are reversed.

Transistor T1 (and also the transistor T2) can be activated cyclically during the charging and/or during the reverse feed, wherein the respective output voltage (during charging: between A+ and A−, during the reverse feed: between E+, E−) can be set via the duty cycle. The switching unit SE includes, as mentioned, a transistor T2 as a second switching element, which is provided between the connecting point VP and the second output potential A−. In particular the function of the step-up conversion of DC voltage results by cyclic switching of the transistors T1, T2, originating from E+,− toward A+,− (charging operation) or in the reverse direction from A+,− toward E+,− (reverse feed operation).

The transistors T1, T2 are shown as MOSFETs with inverse diode. The inverse diodes each have a transmission direction which points from negative to positive output potential (from A+ to A−). Transistors without inverse diode can also be used.

The working inductor L or working inductors L−, L+ of FIGS. 1 and 2 and thus the inductors which represent the storage choke of the converter (or implement its function) are preferably not filter inductors, in particular are not filter inductors of an EMC filter. For FIG. 2, the inductors L−, L+ are preferably not filter chokes of a common mode filter. In particular, the working inductor L or the working inductors L−, L+ of FIGS. 1 and 2 has or have a higher quality than a filter choke, for example, a quality of at least 5, 10, 25, or 50 or also of at least 100 at a frequency of 100 kHz. An EMC filter with at least one filter inductor can be connected upstream of the working inductor L or the working inductors L−, L+ of FIGS. 1 and 2.

Figure 3:
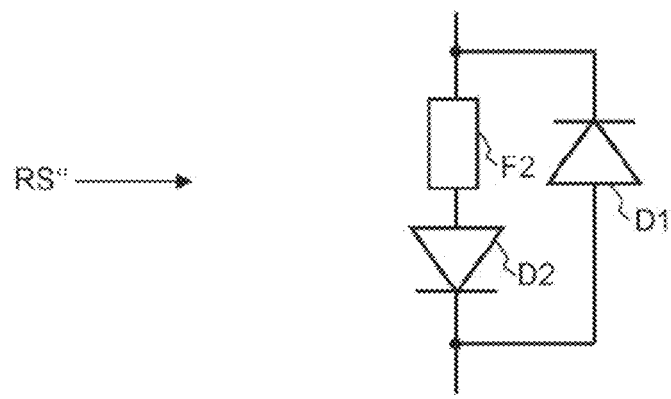
FIG. 3 is used to explain an embodiment of the reverse current blocking device.

FIG. 3 shows a further embodiment of the reverse current blocking device. The second input potential of the input is connected upon application of this embodiment via the illustrated reverse current blocking device RS" to the switching unit SE. The reverse current blocking device RS" is part of the upstream circuit VS.

The reverse current blocking device RS" includes a first diode element D1, which is connected in parallel to a series circuit. This series circuit includes a second diode element D2 (opposite polarity to D1) and a fuse F2. If a fuse F1 is used as shown in FIG. 1, the fuse F1 can then be designated as the first fuse and the fuse F2 of FIG. 3 can be designated as the second fuse. The blocking direction of the first diode element D1 points from the second input potential toward the switching unit and thus transmits the current during a voltage conversion from the input toward the output. The blocking direction of the second diode element points from the switching unit toward the second input potential and thus transmits the current during a voltage conversion from the output toward the input, as is the case during the reverse feed.

If a fault occurs in the ground, in the event of an insulation fault, the current which flows to the second input potential can then be limited by means of the fuse F2. The fuse F2 has a maximum, trigger, or rated current which occurs upon a maximum return feed power, or has a maximum, trigger, or rated current which occurs upon a maximum return feed power, plus a safety margin of 5% or 10% or 20%. The diode D2 can also have a rated current or continuous current at this level, preferably plus a further safety margin. The fuse F1 of FIG. 1 has a maximum, trigger, or rated current which occurs upon a maximum charging power, possibly plus a safety margin of 5% or 10% or 20%. The maximum, trigger, or rated current of the fuse F1 can be at least twice, three times, four times, or five times the maximum, trigger, or rated current of the fuse F1. The rated current of the fuse F1 (cf. FIG. 1) can be, for example, at least 300 A or 350 A. This corresponds to applications which permit rapid charging using direct current in consideration of the specifications of the public power network or in consideration of the general conditions of the (public) power network. In contrast, the fuse F2 has a lower rated current. The rated current of the fuse F2 (cf. FIG. 3) is directed, for example, to the (maximum) return feed current, which can be less than the maximum charging current because of the application. In first applications, the rated current of the fuse F2 can be less than 150 A, less than 125 A, or less than 110 A. In second applications, the rated current of the fuse F2 can be less than 95 A or less than 90 A. In third applications, the rated current of the fuse F2 can be less than 40 A, 35 A, or 30 A. The application is dependent on the security and the phase number of the electrical network connection to which the converter is connected. In particular, the dimensioning of the fuse F2 can be dependent on the rated return feed power, which can be, for example, 40-45 kW, approximately 22 kW, or 11 kW.

Further applications provide that the fuse F2 has a rated current which is less than 70 A, 65 A, or 63 A. The trigger time of the fuse F2 is preferably shorter than the trigger time of the fuse F1 and can be less than half or 20% thereof. The reverse current blocking device shown in FIG. 3 connects the inductor L− (FIG. 2) or the potential E− (FIG. 1) to the potential A− or to the side of the transistor T2 (FIG. 2) or T (FIG. 1) facing away from the point VP. The transmission direction of the diode D1 points in this case toward the potential E−. The diodes D1 and D2 are connected to one another in antiparallel, wherein the diode D2 (having the transmission direction pointing toward the second input potential) is connected in series to the fuse F2 and wherein furthermore this series circuit is connected in (anti-) parallel to the diode D1. The fuse F2 thus only acts in the transmission direction of the diode D2; in the opposite flow direction through the reverse current blocking device of FIG. 3, the diode D1 bypasses the fuse F2, for example, to enable a charging current which is greater than the trigger current of the fuse F2.

In the Figures, a bypass switch BS is shown. The bypass switch BS connects the first input potential E+ in a switchable manner to a corresponding output potential A+ of the switching unit SE. The depicted charge voltage converter includes a first circuit breaker S1, which is provided between the first input potential E+ and the working inductor L, L+ which connects the first input potential E+ to the switching unit SE. In the Figures, a second circuit breaker S2 is shown. In FIG. 1, the second circuit breaker S2 is provided between the second input potential E− and the fuse F1. In FIG. 2, the second circuit breaker S2 is provided between the second input potential E− and the inductor L−.

The invention claimed is:

1. A charging voltage converter on a vehicle comprising an upstream circuit, which includes at least one working inductor, and comprising a switching unit, which is connected downstream of the upstream circuit, wherein the working inductor connects a first input potential of an input of the voltage converter to the switching unit and a second input potential of the input is connected via a reverse current blocking device of the upstream circuit to the switching unit, wherein the reverse current blocking device includes a first diode element, the blocking direction of which points from the second input potential toward the switching unit, and the reverse current blocking device furthermore includes a series circuit made up of a fuse and a second diode element, wherein the blocking direction of the second diode element is opposite to the blocking direction of the first diode element and the series circuit is connected in parallel to the first diode element.

2. The charging voltage converter on a vehicle as claimed in claim 1, wherein the working inductor is provided between the first input potential of the input and a connecting point of two switching elements of the switching unit connected in series and the reverse current blocking device is designed to block a current flow from the switching unit via the reverse current blocking device to the second input potential.

3. The charging voltage converter on a vehicle as claimed in claim 2, wherein the reverse current blocking device includes a diode element, the blocking direction of which points from the second input potential toward the switching unit, or the reverse current blocking device includes a transistor, which is designed to block a current flow from the second input potential toward the switching unit.

4. The charging voltage converter on a vehicle as claimed in claim 2, wherein the two connected switching elements of the switching unit are designed as a transistor and a diode or as two transistors.

5. The charging voltage converter on a vehicle as claimed in claim 2, wherein the charging voltage converter is designed as a unidirectional DC-DC converter.

6. The charging voltage converter on a vehicle as claimed in claim 1, wherein the working inductor is provided as a first working inductor between the first input potential of the input and a connecting point of two switching elements of the switching unit connected in series, and the upstream circuit includes a second working inductor, which is provided in series between the second input potential of the input and the switching unit, and wherein the reverse current blocking device is designed to block a current flow from the switching unit via the reverse current blocking device to the second input potential.

7. The charging voltage converter on a vehicle as claimed in claim 6, wherein the reverse current blocking device includes a transistor, which is designed to block a current flow from the second input potential toward the switching unit.

8. The charging voltage converter on a vehicle as claimed in claim 6, wherein the two connected switching elements of the switching unit are designed as two transistors.

9. The charging voltage converter on a vehicle as claimed in claim 6, wherein the charging voltage converter is designed as a bidirectional DC-DC converter.

10. The charging voltage converter on a vehicle as claimed in claim 6, wherein the upstream circuit includes a free-wheeling diode, which is connected at the connecting point of the switching elements of the switching unit.

11. A charging voltage converter on a vehicle comprising:
an upstream circuit, which includes at least one working inductor;
a switching unit, which is connected downstream of the upstream circuit, wherein the working inductor connects a first input potential of an input of the voltage converter to the switching unit and a second input potential of the input is connected via a reverse current blocking device of the upstream circuit to the switching unit; and
a bypass switch, which connects the first input potential in a switchable manner to a corresponding output potential of the switching unit, wherein the charge voltage converter includes a first circuit breaker, which is provided between the first input potential and the working inductor which connects the first input potential to the switching unit.

* * * * *